July 22, 1941.  S. MILLER  2,250,333
VISIBILITY METER
Filed Dec. 17, 1940  2 Sheets-Sheet 1

INVENTOR
STANLEY MILLER
BY
ATTORNEYS

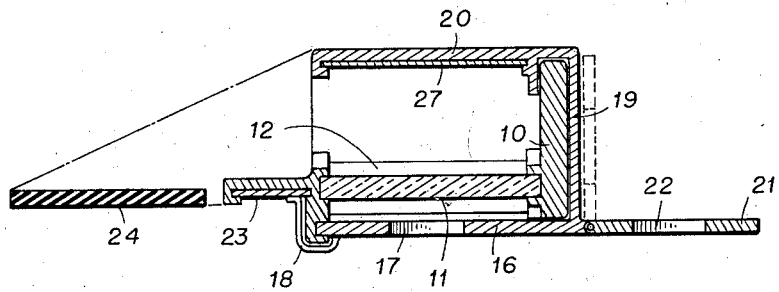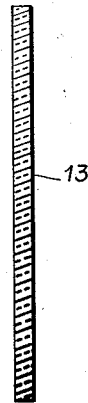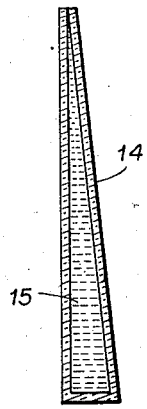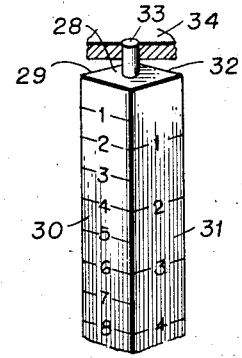

Patented July 22, 1941

2,250,333

UNITED STATES PATENT OFFICE 2,250,333

VISIBILITY METER

Stanley Miller, Missoula, Mont.

Application December 17, 1940, Serial No. 370,527

4 Claims. (Cl. 88—23)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention is of a device for determining the amount of haze between two given points and the visibility distance of objects, and which can, incidentally, be used as a range finder.

The general object of this invention is the provision of a device useful for the purposes mentioned, which is simple in construction and operation, easy to manufacture, and which does not depend upon personal aptitude for obtaining proper and uniform results.

This invention is based on the principle that under a given set of conditions the ease with which an object of specified size can be seen with the naked eye is determined by the amount of haze that exists between the eye and the object and the distance of the object from the eye.

In the accompanying drawings there is illustrated an embodiment of this invention, in which:

Figure 2 is a section along the line 2—2 of Figure 1.

Figures 4 and 5 are longitudinal sections of alternate types of the optical wedge, comprising one of the elements of the invention, and Figure 6 is a fragmentary view illustrating a modification of the extensible scale member forming one of the elements of this invention.

Figure 1:
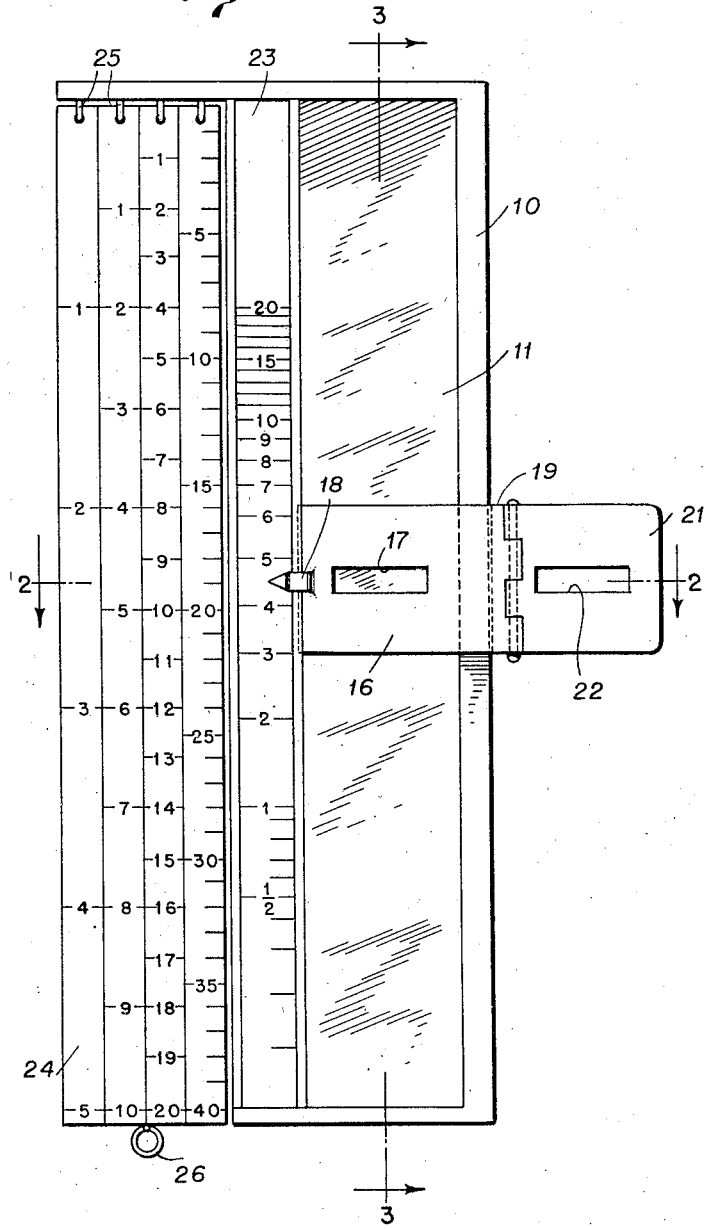
Figure 1 is a front elevation view.
Figure 3:
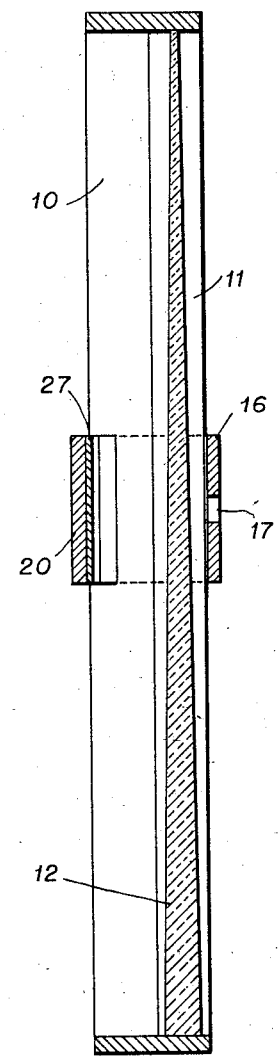
Figure 3 is a section along the line 3—3 of Figure 1.

Referring with more particularity to the drawings in which like numerals designate like parts, the numeral 10 designates a vertical column or base to which is secured an optical wedge 11. The wedge 11 is supported in an upright position against the column 10 and its density varies uniformly from the top to the bottom, the top of the wedge being the area of greatest clearness and the bottom of the wedge the area of greatest density. The optical wedge may be of any desired type. The type illustrated in Figures 1, 2, and 3 is a tapered piece of glass 12 having a uniform haze coloring so that light passing therethrough at a given point is obstructed in an amount corresponding to the thickness of the glass at that point. The type illustrated in Figure 4 is a piece of glass 13 of uniform thickness having a haze gradient from one end to the other. The type illustrated in Figure 5 comprises a triangular vessel 14 which is filled with a haze-colored liquid 15.

In back of the wedge 11 there is disposed an eyepiece, which in the accompanying drawings is shown to consist simply of a plate 16 having a horizontal slit 17 therethrough. This plate 16 carries a pointer 18 and is comounted with a rider 19, slidably operating on the column 10 in a vertical direction, substantially as shown. In line with the slit 17 and the optical wedge 11 there is disposed in front of said wedge a picture mounting 20, which is secured to the rider 19 so as to move therewith. There is also mounted on the rider 19, at the front of the instrument, another eyepiece for viewing distant objects, similar to the eyepiece above mentioned, consisting of a plate 21 with a horizontal slit 22. The slits 17 to 22 are so positioned relative to each other that they will accommodate the two eyes of the operator.

There is fixed with respect to the wedge 11 a vertical scale 23 graduated from the bottom to the top in units of visibility distance corresponding to the optical density gradient of the wedge 11. Adjacent to this scale 23 there is mounted at the top of the instrument an extensible scale 24, which may be of rubber or other suitable material. This scale is affixed at its top to the frame 25 of the device and is free at the bottom where it is provided with a handle 26. By grasping the handle 26 and exerting a downward force, the member 24 may be elongated to any desired length. This scale 24 is graduated from the top to the bottom in units of distance. When the length of the scale 24 is changed, the spacing of the graduations change correspondingly, thus providing the necessary variability for the operation of the device.

In operation, the mounting 20 is provided with a photograph or picture 27 which has substantially the same color and texture of the view where visibility is to be determined, that is to say, of the object whose visibility is to be determined from a given point. For this purpose it is not necessary for the picture or photograph to be of the exact object so long as the color and texture are substantially the same. To use the device, the observer looks through the slit 17 with one eye and through the slit 22 with the other, the slit 22 being directed at an object of known distance from the observer. The rider 19 is then moved vertically with respect to the wedge 11 until the clearness of the view seen through the slit 17 is substantially the same as the clearness of the view through the slit 22. The position of the rider 19 at this point is a function of the amount of haze existing between the eye and the object. By extending the scale 24 until the distance of the object viewed through the slit 22, represented on the scale 24, is opposite the marker 18, the position of every point on the scale 24 will be a function of the amount of haze between the observer and objects whose distance from the observer is represented by these points, assuming that the haze is uniform.

To determine visibility distance, that is, the maximum distance at which an object can be seen, it is necessary to use the scale 23. As previously indicated, this scale is graduated in units of visibility distance. Every point on the scale 23 indicates the distance at which an object can just be seen when the amount of haze existing between the eye of the observer and the object is equal to the density of the optical wedge 11 at that point. This scale may be graduated empirically for the particular type of objects upon which determinations are to be made. For example, in forestry, this scale may be graduated for smoke for use in forest fire work and can be interchanged with scales graduated for different objects.

By adjusting rider 19 to the point where the haze of the optical wedge equals the haze between the observer and an object of known distance and extending the scale 24 so that this distance as represented on the scale 24 is opposite the marker 18, the visibility distance is determined at the point where the same number on the scales 23 and 24 are opposite each other. Objects at distances below this point on the scale 24 would be indicated as being invisible because of the existence of too much haze.

In using this instrument, it may be desirable to proportion the scale 24 differently for different conditions. This may be done by increasing the width of the scale 24, subdividing it in vertical rows and proportioning each row as desired. To avoid confusion in using such a scale, a different arrangement may be employed, as illustrated in Figure 6. In this modification, the member 28, corresponding to the extensible scale 24 in Figures 1, 2, and 3, is made with a square or rectangular cross section to provide four scales, 29, 30, 31, and 32, one on each face. Other shapes may be used, such as pentagonal, hexagonal, and so forth, if additional scales are desired. The top of the member 28 is secured to a stub shaft 33, which is rotatably mounted on top of the frame 34. In this manner, any face of the member 28 may be turned in alignment with the scale 23. Any other type of connection may be made between the member 28 and the frame 34, such as ball and socket, swivel, and so forth, the type illustrated being merely suggestive.

If desired, this device can also be used as a range finder. This is done by first determining visibility distance, in accordance with the procedure outlined above. The instrument is then sighted at an object whose range is to be determined and the rider 19 adjusted until the view seen through both slits 17 and 22 are of equal clearness. The scale 24 is then extended until the scales 23 and 24 coincide at the visibility number. In this position, the point on the scale 24 opposite the pointer 18 is the range or distance of the object from the observer.

Having thus described my invention, I claim:

1. A device of the character described, comprising an optical wedge, a picture mounting on one side and an eyepiece on the other side of said wedge for observing a picture on said mounting through said wedge, said eyepiece and mounting being commovable on said wedge, another eyepiece commovable with the first mentioned eyepiece for viewing a distant object, said picture representing a clear view of an object free from intervening haze and having a color and texture substantially the same as the view where visibility is to be determined, a scale adjacent said wedge having designations corresponding to the gradient of optical density of said wedge, and an extensible scale adjacent the first scale, said extensible scale being graduated in units of distance.

2. A device of the character described, comprising an optical wedge, a picture mounted on one side and an eyepiece on the other side of said wedge for viewing said picture through said wedge, said picture representing a clear view of an object free from intervening haze and having a color and texture substantially the same as the view where visibility is to be determined, said eyepiece and picture being commovable on said wedge, another eyepiece for viewing a distant object, said other eyepiece being commovable with the eyepiece adjacent the wedge, a scale adjacent said wedge having designations corresponding to the gradient of optical density of said wedge, and an extensible scale adjacent the first scale, said extensible scale being graduated in units of distance.

3. A device of the character described, comprising an optical wedge, a picture mounting on one side and an eyepiece on the other side of said wedge for observing a picture on said mounting through said wedge, said eyepiece and mounting being commovable on said wedge, another eyepiece for viewing a distant object, said other eyepiece being commovable with the eyepiece adjacent the wedge, said picture representing a clear view of an object free from intervening haze and having a color and texture substantially the same as the view where visibility is to be determined, a scale adjacent said wedge having designations corresponding to the gradient of optical density of said wedge, an extensible member adjacent said scale, said extensible member having a plurality of faces, each of said faces having a scale, and means for aligning each of said faces with said first-mentioned scale.

4. A device of the character described, comprising an optical wedge, a picture mounting on one side and an eyepiece on the other side of said wedge for observing a picture on said mounting through said wedge, said eyepiece and mounting being commovable on said wedge, another eyepiece for viewing a distant object, said other eyepiece being commovable with the eyepiece adjacent the wedge, said picture representing a clear view of an object free from intervening haze and having a color and texture substantially the same as the view where visibility is to be determined, a scale adjacent said wedge having designations corresponding to the gradient of optical density of said wedge, an extensible member having one end swiveled to the frame of the device at one end of said wedge, the other end of said member being free, said member having a plurality of faces, and a scale carried by each of said faces.

STANLEY MILLER.